United States Patent
Nishizaki et al.

(10) Patent No.: US 11,089,544 B2
(45) Date of Patent: Aug. 10, 2021

(54) VEHICLE COMMUNICATION SYSTEM

(71) Applicant: Yazaki Corporation, Tokyo (JP)

(72) Inventors: Ryohei Nishizaki, Shizuoka (JP); Eita Itou, Shizuoka (JP); You Yanagida, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 16/908,698

(22) Filed: Jun. 22, 2020

(65) Prior Publication Data
US 2020/0413329 A1    Dec. 31, 2020

(30) Foreign Application Priority Data

Jun. 27, 2019    (JP) .............................. JP2019-119774

(51) Int. Cl.
| | |
|---|---|
| *H04W 48/20* | (2009.01) |
| *H04W 4/029* | (2018.01) |
| *H04W 4/40* | (2018.01) |
| *H04W 4/02* | (2018.01) |

(52) U.S. Cl.
CPC .......... *H04W 48/20* (2013.01); *H04W 4/026* (2013.01); *H04W 4/027* (2013.01); *H04W 4/029* (2018.02); *H04W 4/40* (2018.02)

(58) Field of Classification Search
None
See application file for complete search history.

(56) References Cited

U.S. PATENT DOCUMENTS

| | | | |
|---|---|---|---|
| 2012/0176376 A1* | 7/2012 | Kim | ...................... H04W 4/026 345/419 |
| 2014/0274069 A1 | 9/2014 | Scheim et al. | |
| 2016/0112942 A1 | 4/2016 | Chang et al. | |
| 2018/0247544 A1* | 8/2018 | Mustafic | ............... G08G 5/0039 |

FOREIGN PATENT DOCUMENTS

JP    2017-85226 A    5/2017

* cited by examiner

*Primary Examiner* — Ernest G Tacsik
(74) *Attorney, Agent, or Firm* — Kenealy Vaidya LLP

(57) ABSTRACT

A vehicle communication system includes a management server and an in-vehicle communication device. The management server manages the plurality of access points for communication relay. The in-vehicle communication device is mounted on a vehicle and is capable of wireless communication to the access point. The in-vehicle communication device transmits position information indicating a traveling position of the vehicle to the management server. The management server transmits, to the in-vehicle communication device, access point information in which the priority is set on one or more candidate access points selected from among the plurality of access points based on the position information transmitted from the in-vehicle communication device. The in-vehicle communication device connects to an access point determined from among the candidate access points based on the priority in the access point information transmitted from the management server.

4 Claims, 4 Drawing Sheets

FIG.3

| PRIORITY | ACCESS POINT |
|---|---|
| 1 | ACCESS POINT 10D |
| 2 | ACCESS POINT 10C |
| 3 | ACCESS POINT 10F |

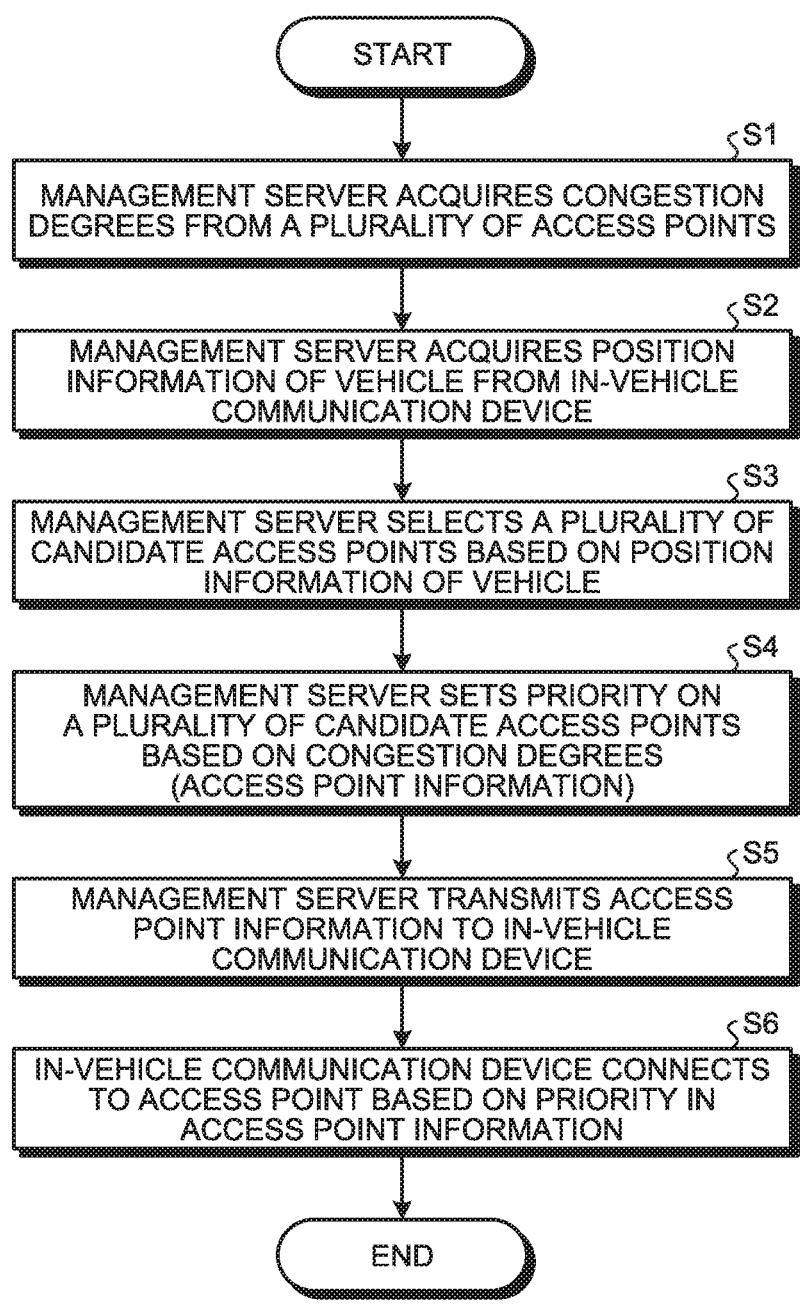

VEHICLE COMMUNICATION SYSTEM

CROSS-REFERENCE TO RELATED APPLICATION(S)

The present application claims priority to and incorporates by reference the entire contents of Japanese Patent Application No. 2019-119774 filed in Japan on Jun. 27, 2019.

BACKGROUND OF THE INVENTION

1. Field of the Invention

The present invention relates to a vehicle communication system.

2. Description of the Related Art

Conventionally, as a vehicle communication system, for example, Japanese Patent Application Laid-open No. 2017-85226 describes a communication system in which a communication terminal performs wireless communication via an access point. This communication system improves convenience while maintaining security by automatically permitting connection to the access point when the MAC address of the communication terminal is already registered in an information table.

Incidentally, in the communication system described in above Japanese Patent Application Laid-open No. 2017-85226, for example, when the communication terminal connects to the access point with a high congestion degree, the communication may be delayed.

SUMMARY OF THE INVENTION

Hence, the present invention has been made in view of the above, and an object of the present invention is to provide a vehicle communication system capable of suppressing a decrease in communication quality.

In order to achieve the above mentioned object, a vehicle communication system according to one aspect of the present invention includes a management server configured to manage a plurality of access points for communication relay; and an in-vehicle communication device that is mounted on a vehicle and is capable of wireless communication with the access point, wherein the in-vehicle communication device transmits position information indicating a traveling position of the vehicle to the management server, the management server transmits, to the in-vehicle communication device, access point information in which priority is set on one or more candidate access points selected from among the plurality of access points based on the position information transmitted from the in-vehicle communication device, and the in-vehicle communication device connects to an access point determined from among the candidate access points based on the priority in the access point information transmitted from the management server.

According to another aspect of the present invention, in the vehicle communication system, it is possible to configure that the management server further narrows down, based on a traveling direction of the vehicle, the candidate access points selected based on the position information transmitted from the in-vehicle communication device.

According to still another aspect of the present invention, in the vehicle communication system, it is possible to configure that the in-vehicle communication device requests the access point information from the management server in a predetermined cycle, and the cycle changes depending on a vehicle speed of the vehicle.

According to still another aspect of the present invention, in the vehicle communication system, it is possible to configure that the management server sets the priority based on at least one of congestion degrees of the candidate access points and a traveling direction of the vehicle.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating access point information according to the embodiment; and FIG. 4 is a flowchart illustrating an operation example of the vehicle communication system according to the embodiment.

DETAILED DESCRIPTION OF THE PREFERRED EMBODIMENTS

A mode for carrying out the present invention (embodiment) will be described in detail with reference to the drawings. The present invention is not limited by the contents described in the following embodiment. Constituent elements described below include those that can be easily assumed by those skilled in the art and those that are substantially the same. Furthermore, configurations described below can be combined as appropriate. Various omissions, substitutions, or changes in the configuration can be made without departing from the scope of the present invention.

Embodiment

Figure 1:
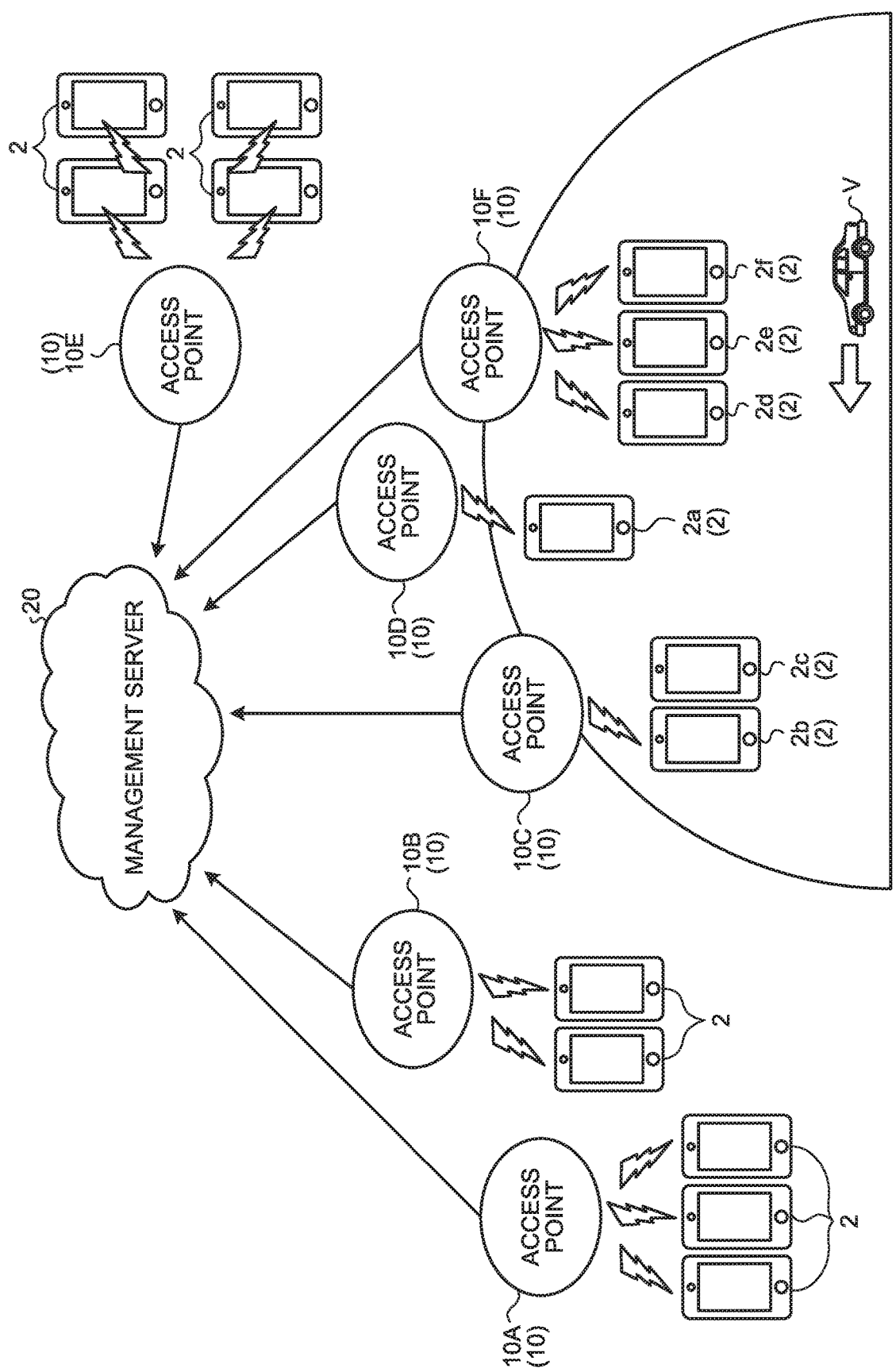
FIG. 1 is a schematic diagram illustrating a configuration example of a vehicle communication system according to an embodiment.
Figure 2:
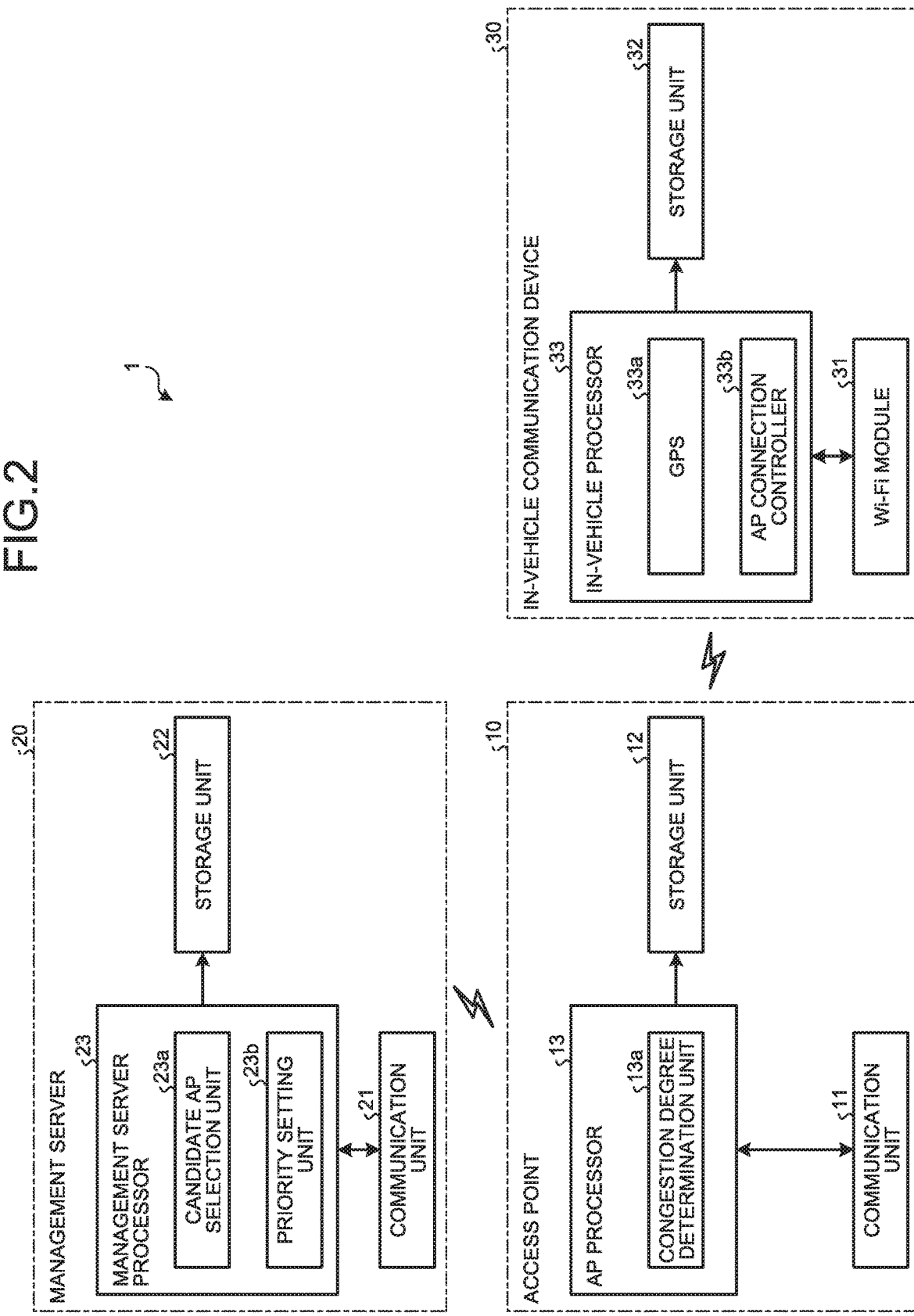
FIG. 2 is a block diagram illustrating the configuration example of the vehicle communication system according to the embodiment.

A vehicle communication system 1 according to an embodiment will be described with reference to the drawings. FIG. 1 is a schematic diagram illustrating a configuration example of the vehicle communication system 1 according to the embodiment. FIG. 2 is a block diagram illustrating the configuration example of the vehicle communication system 1 according to the embodiment. FIG. 3 is a diagram illustrating access point information according to the embodiment. The vehicle communication system 1 is a system in which an in-vehicle communication device 30 mounted on a vehicle V performs wireless communication based on priority of an access point 10. As illustrated in FIG. 1, the vehicle communication system 1, for example, includes a plurality of the access points 10 (10A to 10F), a management server 20, and the in-vehicle communication device 30.

The plurality of access points 10 are communication equipment that configures a wireless Local Area Network (LAN). The plurality of access points 10 are relay points for connection to an external communication network (not illustrated) via the wireless LAN. Each of the plurality of access points 10 configuring the wireless LAN can communicate with the in-vehicle communication device 30 within the coverage area of the access point 10. As illustrated in FIG. 2, the access point 10 includes a communication unit 11, a storage unit 12, and an AP processor 13. The communication unit 11 wirelessly communicates with the management server 20 and the in-vehicle communication device 30. The communication unit 11 is connected to the AP processor 13 and transmits transmission data output from the AP processor 13 to the management server 20 and the in-vehicle communication device 30. Further, the communication unit 11 outputs reception data received from the management server 20 and the in-vehicle communication device 30 to the AP processor 13.

The storage unit 12 is a storage device such as a memory. The storage unit 12 stores conditions and information necessary for various processing by the AP processor 13, various programs and applications executed by the AP processor 13, control data, and the like. The storage unit 12 can also temporarily store various information processed by the AP processor 13. The AP processor 13 reads the information from the storage unit 12 as necessary.

The AP processor 13 connects the in-vehicle communication device 30 with an external communication network in response to a connection request from the in-vehicle communication device 30. The AP processor 13 is configured to include an electronic circuit mainly configured with a known microcomputer including a CPU and an interface. When receiving a connection request from the in-vehicle communication device 30 via the communication unit 11, the AP processor 13 performs a process of connecting with the in-vehicle communication device 30. The AP processor 13, for example, performs authentication based on an SSID, a password, or the like transmitted from the in-vehicle communication device 30, and establishes the connection with the in-vehicle communication device 30 when the authentication is confirmed.

The AP processor 13 is connected by a plurality of communication terminals including the in-vehicle communication device 30 and other communication devices. When data communication is performed by each communication terminal connected to the AP processor 13, a usage rate of the AP processor 13 increases. Here, the usage rate of the AP processor 13 is a rate at which the AP processor 13 is actually processing data with respect to the maximum processing capacity at which the AP processor 13 is capable of processing data. The usage rate of the AP processor 13 indicates a congestion degree of the access point 10, and means that the relatively higher the usage rate, the higher the congestion degree, and the relatively lower the usage rate, the lower the congestion degree.

The AP processor 13 includes a congestion degree determination unit 13a. The congestion degree determination unit 13a determines the congestion degree of the access point 10 based on the usage rate of the AP processor 13. The congestion degree determination unit 13a transmits the determined congestion degree to the management server 20 via the communication unit 11. The congestion degree determination unit 13a transmits the congestion degree to the management server 20 periodically or in response to a request from the management server 20, for example.

The management server 20 is a cloud server that manages the plurality of access points 10. The management server 20 includes a communication unit 21, a storage unit 22, and a management server processor 23. The communication unit 21 wirelessly communicates with the access point 10. The communication unit 21 is connected to the management server processor 23, and transmits transmission data output from the management server processor 23 to the access point 10. In addition, the communication unit 21 outputs reception data received from the access point 10 to the management server processor 23.

The storage unit 22 is a storage device such as a memory. The storage unit 22 stores conditions and information necessary for various processing by the management server processor 23, various programs and applications executed by the management server processor 23, control data, and the like. The storage unit 22 can also temporarily store various information processed by the management server processor 23. The management server processor 23 reads the information from the storage unit 22 as necessary.

The management server processor 23 sets the priority of the access point 10. The management server processor 23 is configured to include an electronic circuit mainly configured with a known microcomputer including a CPU and an interface. The management server processor 23 includes a candidate AP selection unit 23a and a priority setting unit 23b. The candidate AP selection unit 23a selects an access point 10 to be a candidate from among all the access points 10 managed by the management server 20. The candidate AP selection unit 23a selects one or more candidate access points 10 from among the plurality of access points 10 based on, for example, position information transmitted from the in-vehicle communication device 30. The candidate AP selection unit 23a selects, as the candidate access point 10, the access point 10 included in a circle having a predetermined radius around the position of the vehicle V transmitted from the in-vehicle communication device 30, for example. That is, the candidate AP selection unit 23a selects, as the candidate access point 10, the access point 10 from which the in-vehicle communication device 30 at the position of the vehicle V can receive radio waves. For example, when the vehicle V is traveling at the position illustrated in FIG. 1, the candidate AP selection unit 23a selects, as the candidate access points 10, access points 10C, 10D, and 10F from which the in-vehicle communication device 30 can receive radio waves. The candidate AP selection unit 23a outputs the selected candidate access points 10 to the priority setting unit 23b.

The priority setting unit 23b sets the priority on the candidate access points 10 selected by the candidate AP selection unit 23a. The priority setting unit 23b sets the priority of the candidate access points 10 based on the congestion degrees of the candidate access points 10 transmitted from the access points 10. For example, when vehicle V is traveling at the position illustrated in FIG. 1 and the access points 10C, 10D, and 10F are the candidate access points 10, the priority setting unit 23b sets the priority of the access point 10D, the access point 10C, and the access point 10F, based on which the in-vehicle communication device 30 connects, to be higher in this order as illustrated in FIG. 3. This is because, as illustrated in FIG. 1, one communication terminal 2a is connected to the access point 10D, two communication terminals 2b and 2c are connected to the access point 10C, and three communication terminals 2d, 2e, and 2f are connected to the access point 10F, and the congestion degrees of the access point 10D, the access point 10C, and the access point 10F are thus increased in this order. As described above, the priority setting unit 23b sets the priority among the candidate access points 10 to be higher in the increasing order of the congestion degrees. The priority setting unit 23b transmits access point information in which the priority is set on the candidate access points 10

(10C, 10D, 10F) to the in-vehicle communication device 30 via the communication unit 21 or the like.

The in-vehicle communication device 30 connects to an external communication network via the access point 10. The in-vehicle communication device 30 is a device that is mounted on the vehicle V and is capable of wireless communication to the access point 10. The in-vehicle communication device 30 includes a Wireless Fidelity (Wi-Fi) module 31, a storage unit 32, and an in-vehicle processor 33. The Wi-Fi module 31 wirelessly communicates with the access point 10. The Wi-Fi module 31 is connected to the in-vehicle processor 33, and transmits transmission data output from the in-vehicle processor 33 to the access point 10. Further, the Wi-Fi module 31 outputs reception data received from the access point 10 to the in-vehicle processor 33.

The storage unit 32 is a storage device such as a memory. The storage unit 32 stores conditions and information necessary for various processing by the in-vehicle processor 33, various programs and applications executed by the in-vehicle processor 33, control data, and the like. The storage unit 32 can also temporarily store various information processed by the in-vehicle processor 33. The in-vehicle processor 33 reads the information from the storage unit 32 as necessary.

The in-vehicle processor 33 controls connection with the access point 10. The in-vehicle processor 33 is configured to include an electronic circuit mainly configured with a known microcomputer including a CPU and an interface. The in-vehicle processor 33 includes a Global Positioning System (GPS) 33a and an AP connection controller 33b. The GPS 33a is a receiver that receives, as the position information of the vehicle V, GPS information (latitude and longitude coordinates) of the vehicle 2 distributed by a GPS satellite. The GPS 33a transmits the position information of the vehicle V based on the GPS information received from the GPS satellite to the management server 20 via the Wi-Fi module 31 or the like.

The AP connection controller 33b controls connection with the access point 10. The AP connection controller 33b determines an access point 10 to be connected from among the candidate access points 10 based on the priority in the access point information transmitted from the management server 20, and connects to the determined access point 10. For example, when the access point information illustrated in FIG. 3 is transmitted from the management server 20, the AP connection controller 33b first attempts to connect with the access point 10D with the highest priority via the Wi-Fi module 31. The Wi-Fi module 31 checks with the access point 10D whether an SSID is appropriate. When the SSID has been checked, the Wi-Fi module 31 applies to the access point 10D for authentication for connecting to the access point 10D. The access point 10D performs the authentication of the connection by the Wi-Fi module 31 using a predetermined authentication method. When the connection to the access point 10D has been authenticated, the Wi-Fi module 31 makes a connection request to the access point 10D (association request). When the association request is permitted by the access point 10D, the Wi-Fi module 31 starts communication with the access point 10D.

Note that, when attempting to connect with the access point 10D with the highest priority but failing in the connection with the access point 10D, the AP connection controller 33b attempts to connect with the access point 10C with the next highest priority. When failing in the connection with the access point 10C, the AP connection controller 33b attempts to connect with the access point 10F with the next highest priority. When failing in the connection to the access point 10F, the AP connection controller 33b requests the access point information from the management server 20.

The AP connection controller 33b typically requests the access point information from the management server 20 in a predetermined cycle. It is preferable that the cycle of requesting the access point information, that is, the timing at which the access point information is requested, changes depending on the vehicle speed of the vehicle V. This cycle becomes shorter as the vehicle speed of the vehicle V increases, for example. That is, the cycle of requesting the access point information is shorter (the timing is earlier) when the vehicle speed of the vehicle V is 60 km/h rather than 30 km/h.

Next, an operation example of the vehicle communication system 1 will be described. FIG. 4 is a flowchart illustrating the operation example of the vehicle communication system 1 according to the embodiment. In the vehicle communication system 1, the management server 20 acquires the congestion degrees of the access points 10 from the plurality of access points 10 (Step S1). The congestion degree of the access point 10 is represented, for example, by the usage rate of the AP processor 13 of the access point 10. The relatively higher the usage rate of the AP processor 13, the higher the congestion degree, and the relatively lower the usage rate of the AP processor 13, the lower the congestion degree.

Next, the management server 20 acquires the position information of the vehicle V from the in-vehicle communication device 30 (Step S2). Next, the management server 20 selects a plurality of candidate access points 10 based on the position information of the vehicle V (Step S3). The management server 20 selects, as the candidate access point 10, the access point 10 included in a circle having a predetermined radius around the position of the vehicle V, for example. Next, the management server 20 sets the priority on the plurality of candidate access points 10 based on the congestion degrees of the plurality of candidate access points 10 (Step S4). For example, when the vehicle V is traveling at the position illustrated in FIG. 1 and the access points 10C, 10D, and 10F are the candidate access points 10, the management server 20 sets the priority of the access point 10D, the access point 10C, and the access point 10F, based on which the in-vehicle communication device 30 connects, to be higher in this order as illustrated in FIG. 3.

Next, the management server 20 transmits the access point information in which the priority is set to the in-vehicle communication device 30 (Step S5). Next, the in-vehicle communication device 30 connects to the access point 10 based on the priority in the access point information transmitted from the management server 20 (Step S6). For example, when the access point information illustrated in FIG. 3 is transmitted from the management server 20, the in-vehicle communication device 30 first attempts to connect with the access point 10D with the highest priority.

As described above, the vehicle communication system 1 according to the embodiment includes the management server 20 and the in-vehicle communication device 30. The management server 20 manages the plurality of access points 10 for communication relay. The in-vehicle communication device 30 is mounted on the vehicle V and is capable of wireless communication to the access point 10. The in-vehicle communication device 30 transmits the position information indicating the traveling position of the vehicle V to the management server 20. The management server 20 transmits, to the in-vehicle communication device 30, the access point information in which the priority is set on one or more candidate access points 10 selected from among the plurality of access points 10 based on the position information transmitted from the in-vehicle communication device 30. The in-vehicle communication device 30 connects to an access point 10 determined from among the candidate access points 10 based on the priority in the access point information transmitted from the management server 20.

With this configuration, the vehicle communication system 1 can prevent, for example, the in-vehicle communication device 30 from communicating with the access point 10 with a high congestion degree. Therefore, the vehicle communication system 1 can disperse data traffic of the access points 10, and as a result, suppress a decrease in communication quality. Further, the vehicle communication system 1 connects to the access point 10 with a low congestion degree, and can thus shorten the time to complete connection with the access point 10.

In the above vehicle communication system 1, the in-vehicle communication device 30 requests the access point information from the management server 20 in the predetermined cycle. This cycle changes depending on the vehicle speed of the vehicle V. With this configuration, when the vehicle speed of the vehicle V is high, by making the cycle of requesting the access point information from the management server 20 relatively shortened, the vehicle communication system 1 enables transmission of the candidate access points 10 that better correspond to the traveling position of the vehicle V to the in-vehicle communication device 30.

In the above vehicle communication system 1, the management server 20 sets the priority based on the congestion degrees of the candidate access points 10. With this configuration, the vehicle communication system 1 can prevent the in-vehicle communication device 30 from communicating with the access point 10 with a high congestion degree, and as a result, suppress a decrease in communication quality.

Variation

Next, a variation of the embodiment will be described. The candidate AP selection unit 23a of the management server 20 may narrow down the candidate access points 10 based on the traveling direction of the vehicle V. The candidate AP selection unit 23a selects, as the candidate access point 10, the access point 10 included in a circle having a predetermined radius around the position of the vehicle V transmitted from the in-vehicle communication device 30, for example. Next, the candidate AP selection unit 23a narrows down the selected candidate access points 10 based on the traveling direction of the vehicle V. The candidate AP selection unit 23a excludes, for example, the candidate access point 10 located in a direction opposite to the traveling direction of the vehicle V from the position of the vehicle V, and retains the candidate access points 10 located in the traveling direction of the vehicle V from the position of the vehicle V. Then, the priority setting unit 23b sets the priority on the candidate access points 10 located in the traveling direction of the vehicle V.

As a method of acquiring the traveling direction of the vehicle V, the candidate AP selection unit 23a may acquire the traveling direction of the vehicle V from the in-vehicle communication device 30 or obtain the traveling direction of the vehicle V based on the position information of the vehicle V. As described above, in the vehicle communication system 1, the management server 20 further narrows down, based on the traveling direction of the vehicle V, the candidate access points 10 selected based on the position information transmitted from the in-vehicle communication device 30. With this configuration, the vehicle communication system 1 makes it possible to determine an access point 10 to be connected from among the candidate access points 10 located in the traveling direction of the vehicle V, and thus connect to the more appropriate access point 10.

The example of the vehicle communication system 1 has been described in which the candidate access point 10 located in the direction opposite to the traveling direction of the vehicle V from the position of the vehicle V is excluded on the management server 20 side, but the present invention is not limited to this. The above exclusion process may be performed not on the management server 20 side but on the in-vehicle communication device 30 side. In this case, the in-vehicle communication device 30 receives the access point information including position information of the candidate access points 10 and, based on the access point information and the traveling direction of the vehicle V, excludes the candidate access point 10 located in the direction opposite to the traveling direction of the vehicle V from the position of the vehicle V, for example.

In the above description, the example has been described in which the management server 20 sets the priority based on the congestion degrees of the candidate access points 10, but the present invention is not limited to this. The management server 20 may set the priority of the candidate access points 10 based on the traveling direction of the vehicle V. In this case, the priority setting unit 23b of the management server 20 sets the priority to be higher on the candidate access point 10 located in the traveling direction of the vehicle V from the position of the vehicle V than on the candidate access point 10 located in the direction opposite to the traveling direction of the vehicle V from the position of the vehicle V.

Further, the management server 20 may set the priority of the candidate access points 10 based on both the congestion degrees of the candidate access points 10 and the traveling direction of the vehicle V. In this case, for example, the priority setting unit 23b sets the priority to be highest on the candidate access point 10 that is located in the traveling direction of the vehicle V from the position of the vehicle V and has a low congestion degree.

The example has been described in which the congestion degree of the access point 10 is represented by the usage rate of the AP processor 13 of the access point 10, but the present invention is not limited to this, and the congestion degree of the access point 10 may be represented based on another index.

The example has been described in which the GPS 33a transmits the position information of the vehicle V to the management server 20 via the Wi-Fi module 31, but the present invention is not limited this. The GPS 33a may transmit the position information of the vehicle V to the management server 20 via another communication network for a portable (LTE) module capable of wider area communication than the Wi-Fi module 31 or the like.

The example has been described in which the in-vehicle communication device 30 requests the access point information from the management server 20 in the predetermined cycle, and this cycle changes depending on the vehicle speed of the vehicle V, but the present invention is not limited to this, and the cycle may be kept unchanged.

The example has been described in which the management server 20 sets the priority based on at least one of the congestion degrees of the candidate access points 10 and the traveling direction of the vehicle V, but the present invention is not limited to this, and the priority may be set by another method.

The in-vehicle communication device 30 may determine the access point 10 to be connected also based on the radio wave intensity for the access point 10 in addition to the priority in the access point information transmitted from the management server 20.

A vehicle communication system according to the present embodiment makes connection to an access point based on priority, which can suppress communication with the access point having a high congestion degree, and as a result, suppress a decrease in communication quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle communication system comprising:
   a management server configured to manage a plurality of access points for communication relay; and
   an in-vehicle communication device that is mounted on a vehicle and is capable of wireless communication with the access point, wherein
   the in-vehicle communication device transmits position information indicating a traveling position of the vehicle to the management server,
   the management server transmits, to the in-vehicle communication device, access point information in which priority is set on one or more candidate access points selected from among the plurality of access points based on the position information transmitted from the in-vehicle communication device,
   the in-vehicle communication device connects to an access point determined from among the candidate access points based on the priority in the access point information transmitted from the management server,
   the management server sets the priority based on at least one of congestion degrees of the candidate access points and a traveling direction of the vehicle, and
   the candidate access points are closer to the vehicle than a remainder of access points out of the plurality of access points, and one of the candidate access points with a highest priority has a lowest congestion degree, in which the congestion degree is a usage rate of the candidate access points.

2. The vehicle communication system according to claim 1, wherein
   the management server further narrows down, based on a traveling direction of the vehicle, the candidate access points selected based on the position information transmitted from the in-vehicle communication device.

3. The vehicle communication system according to claim 1, wherein
   the in-vehicle communication device requests the access point information from the management server in a predetermined cycle, and
   the cycle changes depending on a vehicle speed of the vehicle.

4. The vehicle communication system according to claim 2, wherein
   the in-vehicle communication device requests the access point information from the management server in a predetermined cycle, and
   the cycle changes depending on a vehicle speed of the vehicle.

* * * * *